Patented Aug. 15, 1950

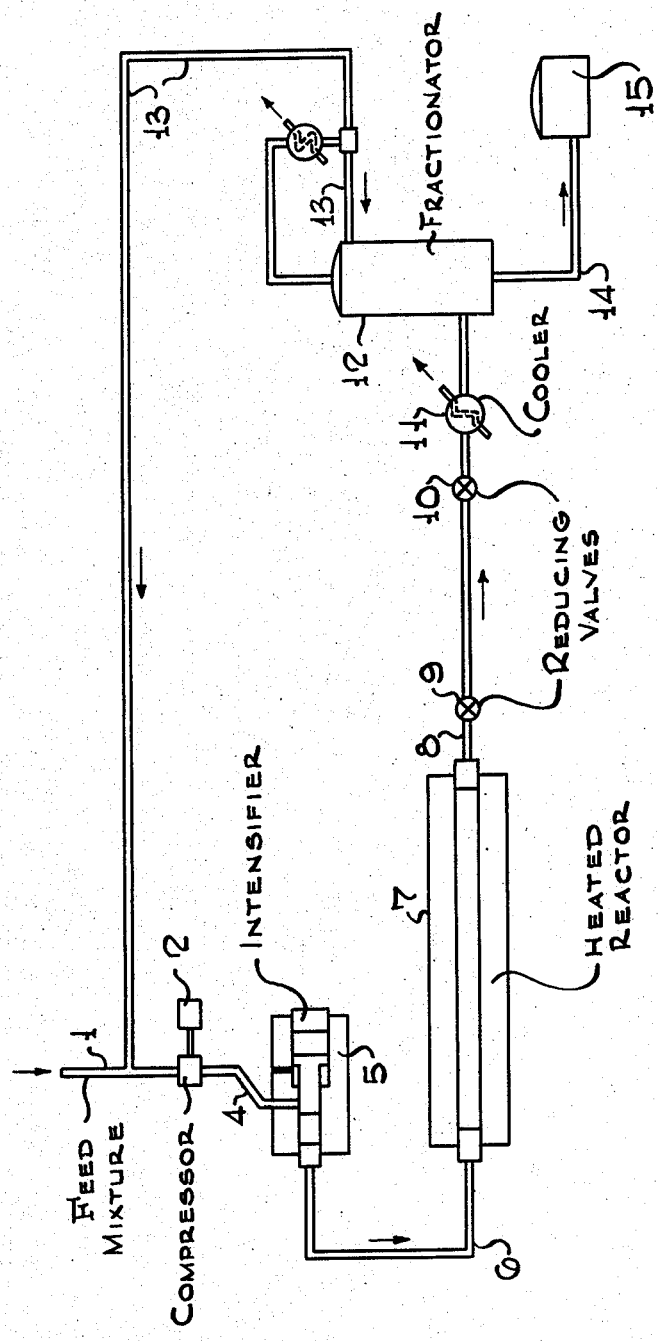

2,519,072

UNITED STATES PATENT OFFICE 2,519,072

NONCATALYTIC ALKYLATION UNDER HIGH PRESSURE

Francis R. Russell, Scotch Plains, N. J., assignor to Standard Oil Development Company, a corporation of Delaware Application December 4, 1946, Serial No. 713,897

2 Claims. (Cl. 260—683.4)

This invention relates to a process for converting hydrocarbons of higher molecular weight and relates more particularly to a process for reacting paraffins and olefins to produce higher molecular weight products suitable as Diesel fuel, jet fuel, etc.

It is known to react paraffins with olefins under pressure in the absence of catalysts to produce antiknock motor fuels. Since a mixture of olefins and paraffins heated under pressure will ordinarily exhibit olefin polymerization, it has been considered necessary to limit the ratio of olefin to paraffin so as to discourage olefin polymerization by the low partial pressure.

It has now been discovered that the ratio of olefins to paraffins can be increased and olefin polymerization minimized if ultra high pressures above 30,000 lbs. are used. When such extremely high pressures are used, the reaction will take place under somewhat lower temperature conditions to produce paraffinic products in high yield. The reaction is particularly well suited to the conversion of gaseous isoparaffins together with any of the gaseous olefins into liquid hydrocarbons suitable as Diesel fuels, jet fuels and the like.

The process consists in subjecting an isoparaffin such as isobutane to a pressure above 30,000 lbs. per square inch, preferably 150,000 lbs. per square inch, adding thereto a gaseous olefin, such as ethylene, propylene or butylene and allowing the mixture to react at temperatures of at least 300° F. The time of contact depends upon the temperature, the higher the temperature the shorter the contact time. The products are cooled and normally liquid hydrocarbons are separated by fractionation.

The products obtained are highly paraffinic, boil in the heavy naphtha or safety fuel range, but are low in octane number and are particularly suitable for use as jet fuels, Diesel fuels or fuel oil. The reaction apparently continues with a secondary alkylation of the alkylate since considerably more olefin is used than paraffin. The products have low bromine numbers indicating that the excess olefin is alkylated rather than polymerized.

The reaction proceeds without the use of catalysts but in some cases, the addition of a small amount of a promoter such as 0.1% benzoyl peroxide is beneficial.

For a further understanding of the invention, reference may be had to the accompanying drawing in which the single figure is an elevational view, generally diagrammatic, showing an apparatus embodying the improvements of the present invention.

Referring now to this drawing, a mixture of propylene and isobutane containing about 30 mol percent of propylene is introduced by line 1 and compressed to about 15,000 lbs. per square inch by compressor 2. The mixture then passes by line 4 to intensifier 5 where the pressure is raised to an extreme pressure of 30,000 lbs. per square inch or more. The hydrocarbon mixture is then passed under this pressure through line 6 into reactor 7 where it is heated to a temperature sufficient to cause reaction between the olefins and isoparaffins.

The product leaves the reactor by line 8 and is reduced in pressure to 15,000 lbs. per square inch by means of reducing valve 9 and finally to a relatively low pressure by reducing valve 10. The product is then passed through cooler 11 and fractionator 12. Overhead from the fractionator is condensed and recycled through line 13 to the reactor. Bottoms from the fractionator are passed through line 14 to storage tank 15.

A number of runs have been carried out on the alkylation of isobutane with propylene with and without the use of benzoyl peroxide as a promoter according to the above-described procedure. The results obtained illustrate the advantages of this invention and are tabulated below:

Reaction of propylene + isobutane at extreme pressures

| Feed, mol Per Cent C₃H₆ | 29.9 | 30.7 | 30.7 | 32.0 | 32.0 | 32.0 | 32.0 |
|---|---|---|---|---|---|---|---|
| Promoter | None | | | 0.1% Benzoyl Peroxide | | | |
| Pressure (atm.) | 8500 | | | | | | |
| Approx. Temp., °F | 550 | 550 | 380 | 350 | 550 | 550 | 640 |
| Time, mins | 90 | 5+ | 92 | 92 | 90 | 5+ | 5+ |
| Recovery, Weight Per Cent | 89 | 104 | 93 | 97 | 98 | 98 | 98 |
| Conversion: | | | | | | | |
| Per Cent C₃H₆ | 69.6 | 31.4 | 17.1 | 34.2 | 81.4 | 56.3 | 87.9 |
| Per Cent of iso C₄H₁₀ | 25.8 | 13.0 | 12.7 | 12.3 | 24.0 | 13.7 | 26.8 |
| Yields, Weight Per Cent on Charge: | | | | | | | |
| C₅ to E. P. | 12.6 | 9.6 | 5.9 | 9.7 | 23.5 | 15.2 | 24.0 |
| E. P., °F | 400 | 390 | 324 | 370 | 400 | 382 | 400 |
| Bottoms | 16.6 | 8.0 | 7.8 | 8.1 | 14.0 | 9.3 | 18.2 |
| Yields, Weight Per Cent on C₃H₆ Converted: | | | | | | | |
| C₅ to E. P. | 119 | 123 | 143 | 112 | 120 | 106 | 108 |
| E. P., °F | 400 | 390 | 324 | 370 | 400 | 382 | 400 |
| Bottoms | 99 | 103 | 189 | 93 | 71 | 65 | 82 |
| Product Inspections: | | | | | | | |
| Bromide No.: | | | | | | | |
| C₅ to E. P., ave | 11.9 | 4.5 | 0.8 | 0.7 | 5.7 | 6.0 | 13.4 |
| C₅ to E. P., Max.¹ | 29.2 | 21.4 | 1.0 | 2.0 | 34.7 | 14.9 | 51.7 |
| Bottoms, ave | 4.1 | | | | | | |
| Cut | #13 | Btms. | | | | 6+7+8 | Btms. | |
| °A. P. I | 41.7 | 35.4 | | | 43.3 | 42.2 | 45.0 | 36.8 | 44.1 |
| RI | 1.4494 | 1.4671 | | | 1.4464 | 1.4498 | 1.4459 | 1.4643 | 1.4464 |
| Anil. Pt., °F | 129 | 198 | | | | 130 | | 186 | 134 |
| Approx. Mid B. P., °F | 376 | 400+ | | | 360 | 380 | 360 | 382+ | 377 |
| Specific Dispersion | 106.9 | 103.7 | | | 106.3 | 109.5 | 107.6 | 106.1 | 107.2 |
| Approx. Composition, Per Cent: | | | | | | | |
| Paraffins | 50 | 80 | | | 50 | 50 | 50 | 80 | 45 |
| Aromatics | 10 | 5 | | | 10 | 15 | 12 | 10 | 12 |
| Naphthenes | 40 | 15 | | | 40 | 35 | 38 | 10 | 43 |

¹ Of any cut.

The above results indicate that even in the absence of traces of promoter, high conversions, particularly of the olefin were obtained at 550° F. and 90 minutes' reaction time. It is furthermore evident from these data that the process of this invention will yield products not obtainable in a simple aggregation of olefin polymerizing and high pressure cracking steps, but will produce new and useful results not hitherto recognized as obtainable.

The foregoing description does not by any means cover the possible uses of our invention nor the forms which it may assume, but serves to illustrate its fundamental principles and an assembly in which the novel features as disclosed above have been incorporated. It is obvious that changes in the details may be made without departing from either its novel characteristics or the spirit and scope of our invention as defined in the appended claims.

The nature and objects of the present invention having been thus fully set forth and specific examples of the same given, what is claimed as new and useful and desired to be secured by Letters Patent is:

1. Process for obtaining hydrocarbons of higher-molecular weight by reacting olefins with isoparaffins which consists of subjecting a mixture of said hydrocarbons containing about 30 mol percent of olefins to a temperature above 300° F. and a pressure over 100,000 lbs. per square inch.

2. Process for obtaining hydrocarbons of higher molecular weight by reacting propylene with isobutane which consists of subjecting a mixture of said hydrocarbons containing about 30 mol percent of propylene to a temperature of 550° to 650° F. and a pressure of 125,000 lbs. per square inch.

FRANCIS R. RUSSELL.

REFERENCES CITED

The following references are of record in the file of this patent:

UNITED STATES PATENTS

| Number | Name | Date |
|---|---|---|
| 2,332,321 | Korpi | Oct. 19, 1943 |
| 2,349,211 | Tulleners | May 16, 1944 |
| 2,379,751 | Russell | July 3, 1945 |
| 2,396,217 | Vaughan et al. | Mar. 5, 1946 |
| 2,407,033 | O'Kelly et al. | Sept. 3, 1946 |
| 2,410,070 | Horton | Oct. 29, 1946 |
| 2,414,311 | Larson | Jan. 14, 1947 |

OTHER REFERENCES

Chem. Eng. Handbook, 2nd ed. (McGraw-Hill), 1941, page 2183.